(12) United States Patent
Lagree et al.

(10) Patent No.: US 9,831,663 B2
(45) Date of Patent: Nov. 28, 2017

(54) SURGE PROTECTION ASSEMBLY AND METHOD FOR ELECTRICAL SWITCHING APPARATUS

(71) Applicant: EATON CORPORATION, Cleveland, OH (US)

(72) Inventors: James L. Lagree, Robinson Township, PA (US); Doug J. Carolan, Columbia, SC (US)

(73) Assignee: EATON CORPORATION, Cleveland, OH (US)

( * ) Notice: Subject to any disclaimer, the term of this patent is extended or adjusted under 35 U.S.C. 154(b) by 527 days.

(21) Appl. No.: 14/267,099

(22) Filed: May 1, 2014

(65) Prior Publication Data

US 2015/0318687 A1    Nov. 5, 2015

(51) Int. Cl.
  *H02H 9/02*   (2006.01)
  *H02H 9/00*   (2006.01)
  *H01H 71/02*  (2006.01)

(52) U.S. Cl.
  CPC .......... *H02H 9/02* (2013.01); *H01H 71/0228* (2013.01); *H02H 9/005* (2013.01); *H01H 71/0264* (2013.01)

(58) Field of Classification Search
  CPC .......... H02H 9/02; H02H 9/005; H02H 5/041; H01T 4/06; Y10T 29/49117
  USPC ......................................... 361/93.1, 118, 124
  See application file for complete search history.

(56) References Cited

U.S. PATENT DOCUMENTS

| 5,010,438 A | * | 4/1991 | Brady | .................... | H02H 9/044 |
| | | | | | 340/638 |
| 5,606,299 A | | 2/1997 | Innes et al. | | |
| 5,652,420 A | | 7/1997 | Innes et al. | | |
| 6,188,560 B1 | * | 2/2001 | Waas | .................... | H01R 4/2408 |
| | | | | | 361/119 |
| 7,138,729 B2 | | 11/2006 | Bailey | | |

(Continued)

FOREIGN PATENT DOCUMENTS

| DE | 10 2005 026714 B3 | 12/2006 |
| DE | 102005026714 | * 12/2006 |

(Continued)

OTHER PUBLICATIONS

European Patent Office, "International Search Report and Written Opinion for PCT/US2015/023981", Jul. 9, 2015, 9 pp.

(Continued)

*Primary Examiner* — Thienvu Tran
*Assistant Examiner* — Lucy Thomas
(74) *Attorney, Agent, or Firm* — Eckert Seamans; John Powers; Grant Coffield

(57) ABSTRACT

An electrical switching apparatus includes a plurality of poles each comprising separable contacts, an operating mechanism structured to open and close the separable contacts and to trip open the separable contacts in response to a fault condition, and a housing enclosing the separable contacts. The housing includes an interior, an exterior, and a plurality of receptacles extending from the exterior toward the interior. A surge protection assembly includes a plurality of modules, wherein each of the modules is removably disposed in a corresponding one of the receptacles of the housing. Each of the modules provides independent surge protection for a corresponding one of the poles of the electrical switching apparatus.

18 Claims, 4 Drawing Sheets

(56) References Cited

U.S. PATENT DOCUMENTS

| | | |
|---|---|---|
| 7,307,823 B2 | 12/2007 | Dabrowski et al. |
| 7,462,952 B2 | 12/2008 | Bailey |
| 7,687,935 B2 | 3/2010 | Bailey |
| 7,688,564 B2 * | 3/2010 | Byrne ................ H01R 13/6666 361/111 |
| 2010/0020459 A1 * | 1/2010 | Goschl ...................... H01T 4/06 361/117 |
| 2012/0206848 A1 * | 8/2012 | Gillespie .................. H01T 4/06 361/104 |

FOREIGN PATENT DOCUMENTS

| | | |
|---|---|---|
| DE | 10 2008 064568 A1 | 6/2010 |
| EP | 2 065 914 A1 | 6/2009 |
| FR | 2 810 468 A1 | 12/2001 |

OTHER PUBLICATIONS

Cooper Bussmann, SurgePOD Surge Protective Overvoltage Devices, 2012, www.cooperbussmann.com.

* cited by examiner

SURGE PROTECTION ASSEMBLY AND METHOD FOR ELECTRICAL SWITCHING APPARATUS

BACKGROUND

Field

The disclosed concept relates generally to electrical switching apparatus and, more particularly, to a surge protection assembly for electrical switching apparatus, such as circuit breakers. The disclosed concept also relates to surge protection methods for circuit breakers.

Background Information

Electrical switching apparatus, such as circuit breakers, provide protection for electrical systems from electrical fault conditions such as, for example, current overloads, short circuits, abnormal voltage and other fault conditions.

One type of abnormal voltage condition is an over-voltage condition, such as transient over-voltage condition, commonly referred to as a "surge." Over-voltage conditions are problematic to electrical systems. Among other problems, they can cause damage to the loads, such as electronic devices or other hardware, coupled thereto. As a result, surge protection devices (SPDs) have been developed to protect the loads from over-voltages that would otherwise cause damage. SPDs typically provide such protection by coupling various types of known transient-suppressing elements between the phase, and neutral and/or ground conductors of an electrical power distribution system. Each SPD is a separate component or device, which must be suitable mechanically coupled and electrically connected as part of the electrical system.

There is room for improvement in surge protection assemblies and methods for electrical switching apparatus, such as circuit breakers.

SUMMARY

These needs and others are met by embodiments of the disclosed concept, which are directed to a surge protection assembly and method for electrical switching apparatus.

As one aspect of the disclosed concept an electrical switching apparatus comprises: a plurality of poles each comprising separable contacts; an operating mechanism structured to open and close the separable contacts and to trip open the separable contacts in response to a fault condition; a housing enclosing the separable contacts, the housing including an interior, an exterior, and a plurality of receptacles extending from the exterior toward the interior; and a surge protection assembly comprising a plurality of modules. Each of the modules is removably disposed in a corresponding one of the receptacles of the housing. Each of the modules provides independent surge protection for a corresponding one of the poles of the electrical switching apparatus.

The housing may further include a first end, a second end disposed opposite and distal from the first end, a first side, a second side disposed opposite the first side, a first surface, and a second surface disposed opposite the first surface. The plurality of receptacles may extend inwardly from the first surface toward the second surface proximate the first end. The surge protection assembly may further comprise a plurality of cover members, wherein each of the cover members is removably coupled to the exterior of the housing at or about a corresponding one of the receptacles in order to at least partially cover the receptacles.

The electrical switching apparatus may be a multi-pole circuit breaker adapted to provide thermal and instantaneous current protection, wherein the plurality of receptacles is one receptacle for each of the poles of the multi-pole circuit breaker, and wherein the plurality of modules is one module for each of the poles of the multi-pole circuit breaker. The modules may be replaceable to customize the multi-pole circuit breaker for a predetermined application. The electrical switching apparatus may be operational both with the modules installed within the receptacles and with at least one of the modules removed from the receptacles.

As another aspect of the disclosed concept, a method of providing surge protection for an electrical switching apparatus including a plurality of poles, comprises: providing the electrical switching apparatus with a housing having an interior, an exterior, and a plurality of receptacles extending from the exterior toward the interior, providing a surge protection assembly comprising a plurality of modules, and inserting each of the modules into a corresponding one of the receptacles to provide independent surge protection for each of the poles of the electrical switching apparatus.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "fastener" refers to any suitable connecting or tightening mechanism expressly including, but not limited to rivets, screws, bolts and the combinations of bolts and nuts (e.g., without limitation, lock nuts) and bolts, washers and nuts.

As employed herein, the term "plug-in" shall mean a secure connection that is established between two components, without requiring a number of separate fasteners and without requiring the use of separate tools.

As employed herein, the statement that two or more parts are "coupled" together shall mean that the parts are joined together either directly or joined through one or more intermediate parts.

As employed herein, the term "number" shall mean one or an integer greater than one (i.e., a plurality).

Figure 1:
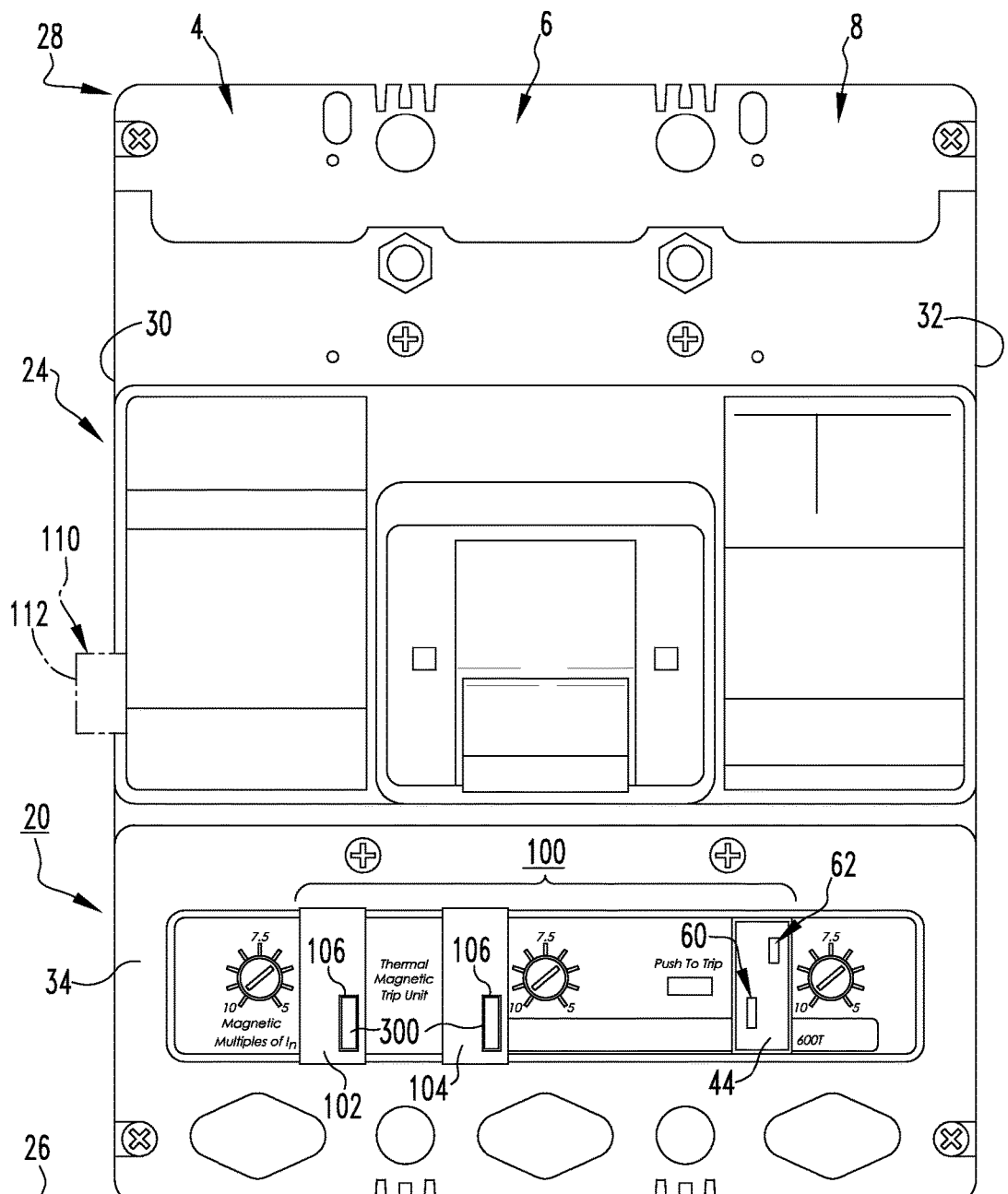
FIG. 1 is a plan view of a circuit breaker and surge protection assembly therefor, in accordance with an embodiment of the disclosed concept.
Figure 2:
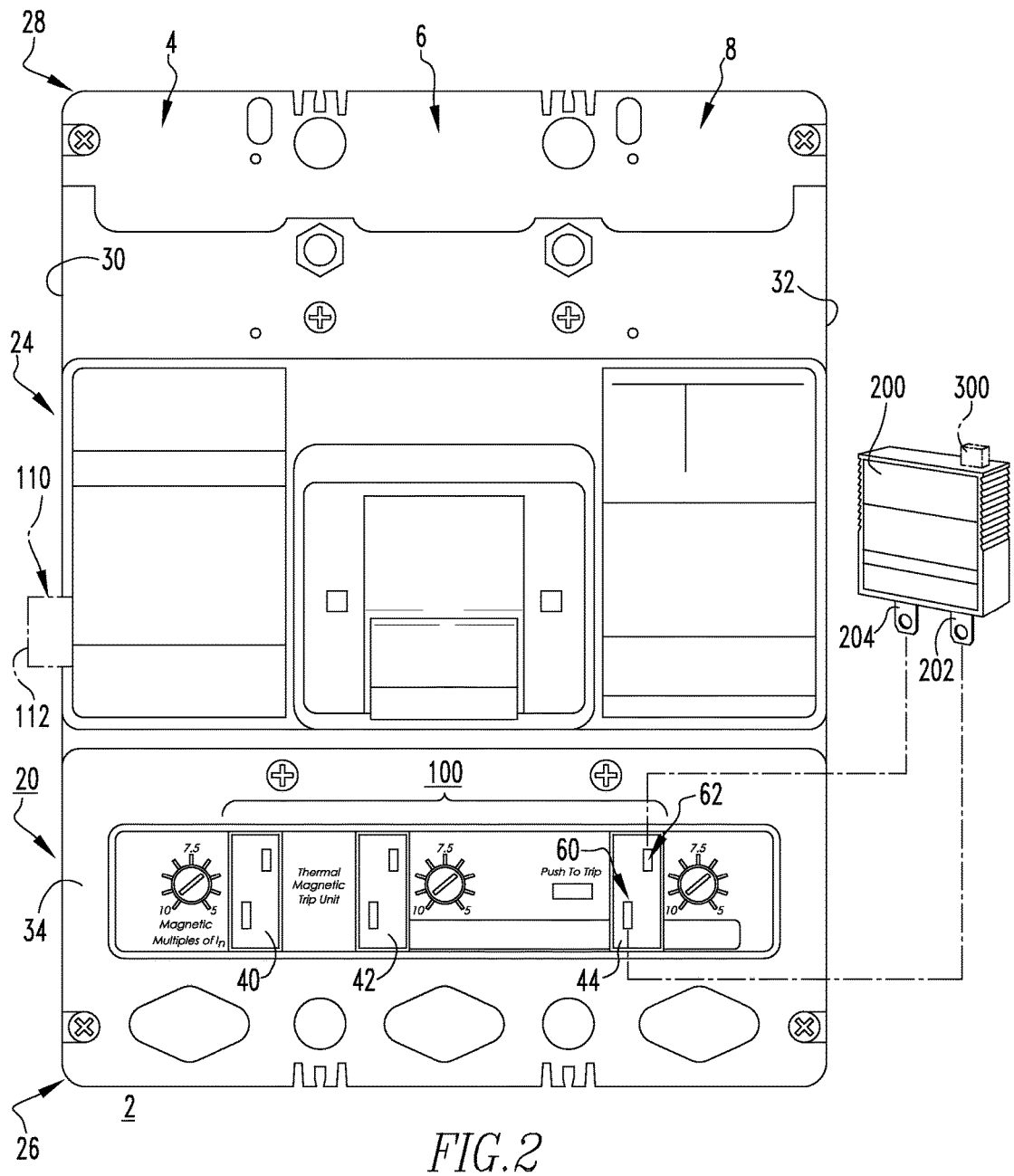
FIG. 2 is a partially exploded view of the circuit breaker and surge protection assembly of FIG. 1, modified to show a surge protection module removed from the circuit breaker.
Figure 3:
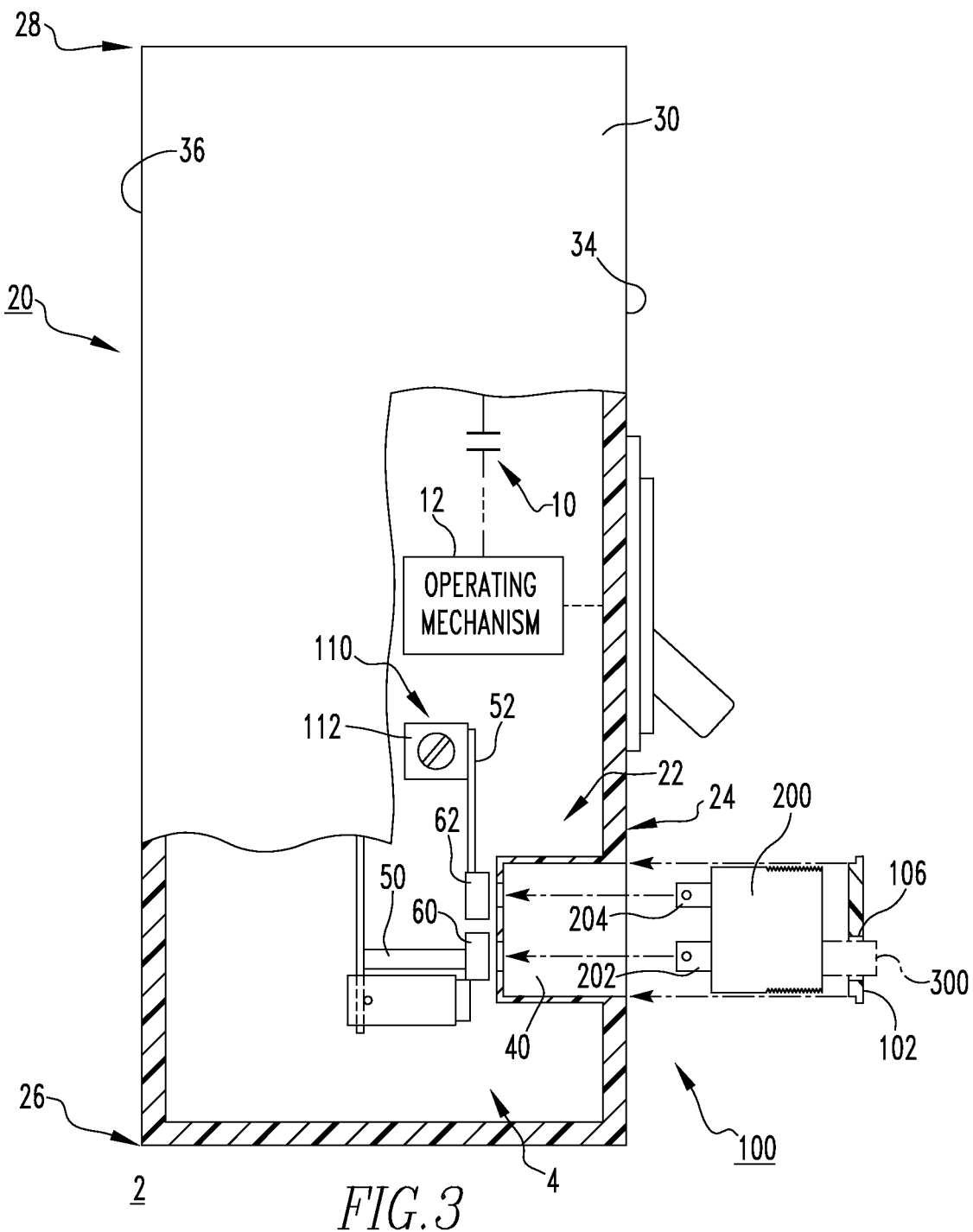
FIG. 3 is a side elevation partially exploded view of the circuit breaker and surge protection assembly of FIG. 2, with a portion of the circuit breaker housing cut away to show internal structures.

FIGS. 1-3 show an electrical switching apparatus, such as for example and without limitation, a multi-pole circuit breaker 2 (e.g., without limitation, three-pole circuit breaker 2) having a surge protection assembly 100, in accordance with a non-limiting embodiment of the disclosed concept. The multi-pole circuit breaker 2 includes a plurality of poles 4,6,8 (all shown and indicated generally in FIGS. 1 and 2). As shown in simplified form in FIG. 3, each pole 4 of the multi-pole circuit breaker 2 includes a pair of separable contacts 10, and an operating mechanism 12 for opening and closing the separable contacts 10. A housing 20 encloses the separable contacts 10, and includes an interior 22, an exterior 24, and a plurality of receptacles 40,42,44 (three are shown) extending from the exterior 24 toward the interior 22.

The surge protection assembly 100 includes a plurality of modules 200 such as, for example and without limitation, surge protection modules. One non-limiting example surge protection module 200 is the SurgePOD™ surge protector module available from Cooper Bussmann, which has a place of business at 114 Old State Road, Ellisville, Mo.

Particularly unique to the disclosed concept is the fact that each of the modules 200 is removably disposed in a corresponding one of the receptacles 40 of the circuit breaker housing 20, as best shown in FIG. 3. It will be appreciated that, for ease of illustration and economy of disclosure, only one module 200 and one corresponding receptacle 40 of the example surge protection assembly 100 will be shown and described in detail herein.

Continuing to refer to FIG. 3, the circuit breaker housing 20 further includes a first end 26, a second end 28 disposed opposite and distal from the first end 26, first and second opposing sides 30,32, (both shown in FIGS. 1 and 2) and first and second opposing surfaces 34,36. The receptacles 40 preferably extend inwardly from the first surface 34 toward the second surface 36 proximate the first end 26 (e.g., without limitation, the load end) of the circuit breaker 2, as shown.

As shown in FIGS. 1 and 3, the example surge protection assembly 100 further includes a plurality of cover members 102,104. Each of the cover members 102,104 is structured to be removably coupled to the exterior 24 of the housing 2 at or about a corresponding one of the receptacles 40,42,44 (all shown in FIG. 2), in order to cover the receptacles 40,42,44. It will be appreciated that in FIG. 1, two cover members 102,104 are shown covering receptacles 40,42 (not numbered in FIG. 1, but see receptacles 40,42 of FIG. 2), whereas the cover member (not shown) has been removed from the third receptacle 44. The covers 102, 104 may be used when the modules 200 are inserted and/or if the modules 200 are removed, to protect internal components. In FIG. 2, all of the cover members have been removed, and in FIG. 3 one cover member 102 is shown in exploded relationship with respect to receptacle 40 and module 200. The cover members 102,104 may be made from any known or suitable material (e.g., without limitation, rubber; plastic), and are preferably removably attached, without requiring a number of separate fasteners. In this manner, the cover members 102,104 serve to enclose and protect the surge protection assembly 100 when the modules 200 are disposed within their corresponding receptacles 40,42,44.

As shown in FIGS. 1-3, the example modules 200 further include an indicator 300 (see, e.g., without limitation, button indicator 300, shown in simplified form in phantom line drawing in FIGS. 2 and 3) adapted to provide a visual indication in response to an actuation of the module 200. For example and without limitation, the button indicator 300 may pop out or extend outwardly from the module 200 to indicate, for example, that the module 200 has clamped on a surge. The operator will, therefore, be alerted, for example, to replace the module 200. It will be appreciated, however, that any known or suitable alternative indicator (not shown) other than the example button indicator 300 shown and described herein, could be employed without departing from the scope of the disclosed concept. For example and without limitation, a suitable light indicator (e.g., without limitation, LED indicator)(not shown), or any other trip flag or indicia (not shown) could be employed. It will also be appreciated that the cover members 102,104 may include an opening 106 (see FIG. 1; see also opening 106 in cover member 102 of FIG. 3), or window (not shown) to provide access for the indicator 300 such that it may be readily observed.

In the example shown and described herein, each of poles 4,6,8 has one receptacle 40,42,44 structured to receive one corresponding module 200. The example multi-pole circuit breaker 2 is a three-pole circuit breaker 2 having three poles 4,6,8. Thus, the example surge protection assembly 100 has three corresponding receptacles 40,42,44 each adapted to receive a corresponding module 200. It will be appreciated, therefore, that each of the modules 200 provides independent surge protection for a corresponding one of the poles 4,6,8 of the multi-pole circuit breaker 2. It will also be appreciated that each module is removable or replaceable, without opening or disassembling the circuit breaker 2. Thus, it is possible to customize the circuit breaker 2 for a variety of predetermined applications. It will further be appreciated that the circuit breaker 2, or other known or suitable electrical switching apparatus (not shown), is operational both with the modules 200 installed within the receptacles 40,42,44, as well as when one or more of the modules 200 are removed from their corresponding receptacles 40,42,44.

Accordingly, a unique aspect of the disclosed surge protection assembly 100 is that a plurality of individual surge protection modules 200 are employed within the circuit breaker housing 20, yet the circuit breaker 2 can perform all of its normal opening, closing and protection functions. Furthermore, each of the modules 200 can be changed (e.g., without limitation, removed; replaced; exchanged) individually. Thus, the circuit breaker 2 is customizable for a wide variety of different predetermined applications. For example and without limitation, different modules 200 could be employed for different voltages.

It will be appreciated that while the disclosed concept has been shown and described herein with respect to a three-pole circuit breaker 2, it could also be employed with any known or suitable alternative multi-phase electrical switching apparatus (not shown). For example and without limitation, it could be employed with a two-pole circuit breaker (not specifically shown, but similar to circuit breaker 2 but only having two poles (e.g., 4,6)) for protecting two phases, or with a four pole circuit breaker (not shown) to protect three phases and/or including the neutral. In other words, the disclosed surge protection assembly 100 is anticipated to be applicable for use with a wide variety of additional and alternative multi-phase electrical switching apparatus (not shown) other than the non-limiting example three-pole circuit breaker 20 shown and described herein.

As best shown in the partially sectioned view of FIG. 3 (see also FIG. 4), each of the poles 4 further includes a plurality of conductors 50,52 electrically connected to a plurality of sockets 60,62. The sockets 60,62 are accessible from within the receptacles 40, as shown. Each of the modules 200 has a plurality of electrical connectors 202,204. Accordingly, when the modules 200 are installed within their corresponding receptacles 40, the electrical connectors 202,204 are in electrical communication with the sockets 60,62 and the conductors 50,52, respectively, of a corresponding one of the poles 4 of the multi-pole circuit breaker 2. It will be appreciated that only one pole 4 and the conductors 50,52 and sockets 60,62 therefor are described in detail, herein for ease of illustration and economy of disclosure. It will also be appreciated that, while the electrical connectors 202,204 of the example surge protection module 200 are stabs 202,204, other known or suitable connectors (not shown) could be employed without departing from the scope of the disclosed concept. The example stabs 202,204 extend outwardly from the module 200 and advantageously provide a plug-in electrical connection with corresponding sockets 60,62. That is, the stabs 202,204 provide an effective electrical connection that is also mechanically secure without requiring any separate hardware or tools.

Figure 4:
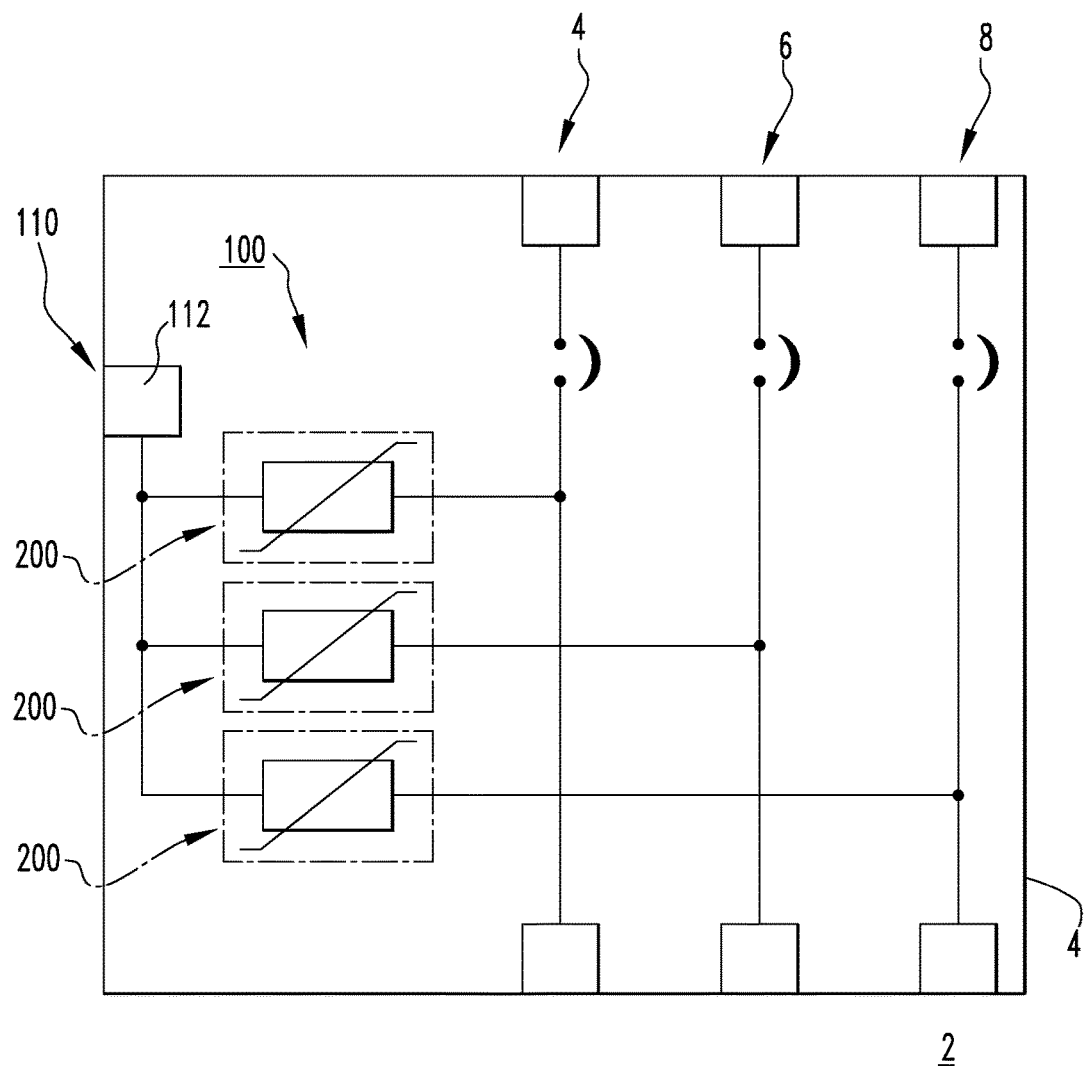
FIG. 4 is a schematic view of the circuit breaker and surge protection assembly of FIG. 3.

The example surge protection assembly 100 preferably further includes an Earth connection 110. As shown in FIGS. 3 and 4, the Earth connection 110 is in electrical communication with a corresponding one of the sockets 62. In the example shown and described herein, the Earth connection 110 includes an Earth terminal 112. The Earth terminal 112 (shown in simplified form in phantom line drawing in FIGS. 1 and 2) is preferably accessible from the exterior 24 of the circuit breaker housing 20. For example and without limitation, in the example of FIGS. 1-3, the Earth terminal 112 is accessible on the first side 30 of the circuit breaker housing 20.

Accordingly, the disclosed surge protection assembly 100 provides a unique mechanism and method for customizing a circuit breaker 2 or other suitable electrical switching apparatus (not shown) by installing different removable surge protection modules 200 within corresponding receptacles 40,42,44, such that each module 200 is removably disposed within the circuit breaker housing 200, yet the circuit breaker 2 is fully operational with the modules 200 disposed in their corresponding receptacle 40,42,44, or with one or more of the modules 200 removed. When the modules 200 are installed, each module 200 advantageously provides independent surge protection for a corresponding one of the poles 4,6,8 of the multi-pole circuit breaker 2. Thus, the disclosed concept advantageously provides a fully functioning electrical switching apparatus 2 incorporating normal operation, as well as thermal and short circuit protection, including surge protection, all within the footprint of the circuit breaker 2.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An electrical switching apparatus comprising:
a plurality of poles each comprising separable contacts;
an operating mechanism structured to open and close said separable contacts and to trip open said separable contacts in response to a fault condition;
a first housing enclosing said separable contacts, said first housing including an interior, an exterior, and a plurality of receptacles extending from the exterior toward the interior; and
a surge protection assembly comprising a plurality of modules each having a second housing separate and distinct from said first housing,
wherein said receptacles are sized substantially the same as said modules, in order for said modules to fit within said receptacles,
wherein each of said modules is removably disposed inside a corresponding one of said receptacles of said first housing,
wherein each of said modules provides independent surge protection for a corresponding one of the poles of said electrical switching apparatus, wherein said surge protection assembly further comprises a plurality of cover members each being removably attached to and separate and distinct from a corresponding one of said modules, wherein each of said cover members is removably coupled to the exterior of said first housing at or about a corresponding one of said receptacles in order to substantially cover said receptacles, wherein each of said modules is substantially cooperatively enclosed on all sides by a corresponding one of said cover members and said first housing, wherein said second housing of each of said modules comprises a first side portion, a second side portion disposed opposite the first side portion, a third side portion extending from the first side portion to the second side portion, a fourth side portion opposite the third side portion and extending from the first side portion to the second side portion, a fifth side portion extending from the first side portion to the second side portion and from the third side portion to the fourth side portion, and a sixth side portion opposite the fifth side portion, wherein the sixth side portion extends from the first side portion to the second side portion and from the third side portion to the fourth side portion, wherein the first side portion faces said corresponding one of said cover members, and wherein the second side portion, the third side portion, the fourth side portion, the fifth side portion, and the sixth side portion each face said first housing and do not face said corresponding one of said cover members.

2. The electrical switching apparatus of claim 1 wherein said first housing further includes a first end, a second end disposed opposite and distal from the first end, a first side, a second side disposed opposite the first side, a first surface, and a second surface disposed opposite the first surface; and wherein said plurality of receptacles extend inwardly from the first surface toward the second surface proximate the first end.

3. The electrical switching apparatus of claim 1 wherein said electrical switching apparatus is a multi-pole circuit breaker; wherein said plurality of receptacles is one receptacle for each of the poles of said multi-pole circuit breaker; and wherein said plurality of modules is one module for each of the poles of said multi-pole circuit breaker.

4. The electrical switching apparatus of claim 3 wherein said plurality of poles is three poles; and wherein said plurality of modules is three modules.

5. The electrical switching apparatus of claim 3 wherein said modules are replaceable to customize said multi-pole circuit breaker for a predetermined application.

6. The electrical switching apparatus of claim 1 wherein said electrical switching apparatus is operational both with said modules installed within said receptacles and with at least one of said modules removed from said receptacles.

7. The electrical switching apparatus of claim 1 wherein each of the poles further comprises a plurality of conductors electrically connected to a plurality of sockets; wherein said sockets are accessible from within said receptacles; wherein each of said modules has a plurality of electrical connectors; and wherein, when said modules are installed within said receptacles, said electrical connectors are in electrical communication with said sockets and said conductors of a corresponding one of the poles of said electrical switching apparatus.

8. The electrical switching apparatus of claim 7 wherein said electrical connectors are stabs; wherein said stabs extend outwardly from said modules; and wherein said stabs provide a plug-in electrical connection with said sockets.

9. The electrical switching apparatus of claim 7 wherein said surge protection assembly further comprises an Earth connection; and wherein said Earth connection is in electrical communication with a corresponding one of said sockets.

10. The electrical switching apparatus of claim 9, wherein said first housing further includes a first side and a second side disposed opposite the first side; wherein said Earth connection includes an Earth terminal; and wherein said Earth terminal is disposed on the first side of said first housing.

11. The electrical switching apparatus of claim 3 wherein said operating mechanism comprises a main operating handle; wherein each of said modules has an indicator separate and distinct from said main operating handle; wherein said indicator is adapted to provide a visual indication in response to the actuation of a corresponding one of said modules; and wherein each corresponding cover member of said plurality of cover members has an opening to provide access to said indicator such that it may be readily observed through said corresponding cover member.

12. A method of providing surge protection for an electrical switching apparatus including a plurality of poles, the method comprising:
providing said electrical switching apparatus with a first housing having an interior, an exterior, and a plurality of receptacles extending from the exterior toward the interior,
providing said electrical switching apparatus with an operating mechanism comprising a main operating handle,
providing a surge protection assembly comprising a plurality of modules each having a button indicator separate and distinct from said main operating handle, and a second housing separate and distinct from said first housing
responsive to an actuation of a corresponding one of said modules, providing a visual indication by popping said button indicator out from said corresponding one of said modules in order to indicate that said corresponding one of said modules has clamped on a surge,
inserting each of said modules into a corresponding one of said receptacles to provide independent surge protection for each of said poles of the electrical switching apparatus,
providing a number of cover members, and
removably coupling said number of cover members to the exterior of said first housing at or about at least one of said receptacles,
wherein said receptacles are sized substantially the same as said modules, in order for said modules to fit within said receptacles,
wherein each of said modules is removably disposed inside a corresponding one of said receptacles of said first housing,
wherein each of said modules is substantially cooperatively enclosed on all sides by a corresponding one of said cover members and said first housing, wherein said second housing of each of said modules comprises a first side portion, a second side portion disposed opposite the first side portion, a third side portion extending from the first side portion to the second side portion, a fourth side portion opposite the third side portion and extending from the first side portion to the second side portion, a fifth side portion extending from the first side portion to the second side portion and from the third side portion to the fourth side portion, and a sixth side portion opposite the fifth side portion, wherein the sixth side portion extends from the first side portion to the second side portion and from the third side portion to the fourth side portion, wherein the first side portion faces said corresponding one of said cover members, and wherein the second side portion, the third side portion, the fourth side portion, the fifth side portion, and the sixth side portion each face said first housing and do not face said corresponding one of said cover members.

13. The method of claim 12, further comprising:
replacing or exchanging at least one of said modules.

14. The method of claim 12, wherein said first housing further includes a first end, a second end disposed opposite and distal from the first end, a first side, a second side disposed opposite the first side, a first surface, and a second surface disposed opposite the first surface; and wherein said plurality of receptacles extend inwardly from the first surface toward the second surface proximate the first end.

15. The method of claim 12, wherein said electrical switching apparatus is a multi-pole circuit breaker adapted to provide thermal and instantaneous current protection; wherein said plurality of receptacles is one receptacle for each of the poles of said multi-pole circuit breaker; and wherein said plurality of modules is one module for each of the poles of said multi-pole circuit breaker.

16. The method of claim 15, wherein said plurality of poles is three poles; and wherein said plurality of modules is three modules.

17. The method of claim 12, wherein said electrical switching apparatus is operational both with said modules installed within said receptacles and with at least one of said modules removed from said receptacles.

18. The electrical switching apparatus of claim 1 wherein said exterior of said first housing has a profile having a top surface; and wherein the first side portion of said second housing of each of said modules is disposed within said corresponding one of said receptacles of said first housing without extending beyond the top surface.

* * * * *